United States Patent
Cho et al.

(10) Patent No.: US 11,628,834 B2
(45) Date of Patent: Apr. 18, 2023

(54) HYBRID ELECTRIC VEHICLE AND METHOD OF CONTROLLING THE SAME TO AVOID COLLISION THEREOF

(71) Applicants: Hyundai Motor Company, Seoul (KR); Kia Motors Corporation, Seoul (KR)

(72) Inventors: Jin Kyeom Cho, Gyeonggi-do (KR); Ji Hoon Kang, Seoul (KR); Yeon Bok Kim, Gyeonggi-do (KR); Myung Woo Kim, Gyeonggi-do (KR); Chan Ho Lee, Seoul (KR); Tae Wook Park, Incheon (KR); Kyu Hwan Jo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 189 days.

(21) Appl. No.: 17/109,534

(22) Filed: Dec. 2, 2020

(65) Prior Publication Data
US 2021/0370923 A1 Dec. 2, 2021

(30) Foreign Application Priority Data
Jun. 2, 2020 (KR) .................. 10-2020-0066557

(51) Int. Cl.
| | |
|---|---|
| *B60W 30/09* | (2012.01) |
| *B60W 10/02* | (2006.01) |
| *B60W 10/06* | (2006.01) |
| *B60W 10/08* | (2006.01) |
| *B60W 20/15* | (2016.01) |

(Continued)

(52) U.S. Cl.
CPC ............ *B60W 30/09* (2013.01); *B60W 10/02* (2013.01); *B60W 10/06* (2013.01); *B60W 10/08* (2013.01);
(Continued)

(58) Field of Classification Search
CPC ...... B60W 30/09; B60W 20/15; B60W 10/02; B60W 10/06; B60W 10/08; B60W 50/087;
(Continued)

(56) References Cited

U.S. PATENT DOCUMENTS

| | | | |
|---|---|---|---|
| 2003/0183431 A1* | 10/2003 | Cikanek | ............... B60W 10/06 180/65.6 |
| 2017/0058806 A1* | 3/2017 | Soller | .................. B60W 10/08 |

(Continued)

FOREIGN PATENT DOCUMENTS

| | | |
|---|---|---|
| KR | 2016-0065539 A | 6/2016 |
| KR | 2018-0078986 A | 7/2018 |

*Primary Examiner* — George C Jin
(74) *Attorney, Agent, or Firm* — Fox Rothschild LLP (57) ABSTRACT

A hybrid electric vehicle and a method of controlling the same are provided to avoid a collision thereof attributable to erroneous operation of an accelerator pedal. The method includes determining whether an accelerator pedal is erroneously operated in the situation in which an obstacle is detected to be present in the traveling path. In response to determining that the accelerator pedal is erroneously operated, the method includes switching the driving mode to a mode in which an engine is disconnected from a driving shaft and a motor generates driving force. The number of revolutions per minute (RPM) of the engine is then adjusted based on the extent to which the accelerator pedal is operated and the torque of the motor is adjusted based on a first vehicle speed and the distance to the obstacle.

17 Claims, 5 Drawing Sheets

(51) Int. Cl.
*B60W 50/08* (2020.01)
*B60W 50/14* (2020.01)

(52) U.S. Cl.
CPC .......... *B60W 20/15* (2016.01); *B60W 50/087* (2013.01); *B60W 50/14* (2013.01); *B60W 2050/146* (2013.01); *B60W 2520/10* (2013.01); *B60W 2540/10* (2013.01); *B60W 2554/802* (2020.02); *B60W 2710/021* (2013.01); *B60W 2710/0644* (2013.01); *B60W 2710/083* (2013.01)

(58) Field of Classification Search
CPC ........... B60W 50/14; B60W 2554/802; B60W 2520/10; B60W 2540/10; B60W 2710/021; B60W 2710/0644; B60W 2710/083
See application file for complete search history.

(56) References Cited

U.S. PATENT DOCUMENTS

| | | | |
|---|---|---|---|
| 2020/0062246 A1* | 2/2020 | Park | B60Q 1/44 |
| 2020/0247408 A1* | 8/2020 | Lim | B60W 30/17 |
| 2020/0307581 A1* | 10/2020 | Shimbo | B60W 50/087 |
| 2020/0317051 A1* | 10/2020 | Koo | B60W 30/09 |
| 2021/0213942 A1* | 7/2021 | Kayano | B60W 10/182 |
| 2021/0213967 A1* | 7/2021 | Tochigi | B60W 50/12 |
| 2021/0221365 A1* | 7/2021 | Mase | B60W 30/09 |
| 2021/0370923 A1* | 12/2021 | Cho | B60K 6/442 |
| 2022/0176982 A1* | 6/2022 | Kakeshita | B60W 50/12 |

* cited by examiner

HYBRID ELECTRIC VEHICLE AND METHOD OF CONTROLLING THE SAME TO AVOID COLLISION THEREOF

CROSS-REFERENCE TO RELATED APPLICATION(S)

This application claims the benefit of Korean Patent Application No. 10-2020-0066557, filed on Jun. 2, 2020, which is hereby incorporated by reference as if fully set forth herein.

BACKGROUND

Field of the Disclosure

The present disclosure relates to a hybrid electric vehicle and a method of controlling the same to avoid a collision thereof attributable to erroneous operation of an accelerator pedal.

Discussion of the Related Art

Vehicle accidents attributable to erroneous operation of an accelerator pedal continue to occur. To prevent such accidents, some countries provide incentives, such as tax benefits, to manufacturers of vehicles having functions for preventing erroneous operation by drivers to induce the development of erroneous operation prevention functions and vehicles equipped with the same.

A general driver erroneous operation prevention function is implemented to suddenly limit the output torque of the engine by automatically recognizing, based on the driver's behavior and voice, the state in which the driver erroneously operates the accelerator pedal without being aware of the erroneous operation, or is implemented to detect a pedestrian by fusing information detected through different types of sensors and to warn of the possibility of a collision with the pedestrian by increasing the accuracy with which the distance to the detected pedestrian is measured and the speed relative to the detected pedestrian.

However, if the torque is suddenly limited to brake the vehicle to prevent a collision, an accident may still occur due to deterioration of drivability. In addition, it is difficult for the driver to effectively respond to the risk of a collision merely by being provided with a simple warning of the possibility of a collision.

Meanwhile, when the driver erroneously operates the accelerator pedal instead of the brake pedal, the noise generated from the engine increases due to an increase in the number of revolutions per minute (RPM) of the engine attributable to the operation of the accelerator pedal. In particular, the driver may recognize the erroneous operation by hearing the noise. However, in the case of an environmentally friendly vehicle equipped with a motor as a power source, e.g. a hybrid electric vehicle (HEV), it may be difficult for the driver to recognize erroneous operation through hearing the noise.

Specifically, a hybrid electric vehicle generally uses two power sources. A hybrid electric vehicle has a motor as a power source in addition to an engine. In such a hybrid electric vehicle, since the operation state of the driving source varies based on the traveling state of the vehicle, the operation of the accelerator pedal does not necessarily cause an increase in the noise of the driving source. For example, when a hybrid electric vehicle is driven in an electric vehicle (EV) mode, in which only a motor is used as a driving source, even if an accelerator pedal is erroneously operated, a change in the noise from the power source (i.e. the motor) attributable to an increase in revolutions per minute (RPM) is insignificant compared to an engine. Therefore, there is need for the development of a method of controlling a hybrid electric vehicle to more effectively avoid a collision thereof.

SUMMARY

Accordingly, the present disclosure is directed to a hybrid electric vehicle and a method of controlling the same to avoid a collision thereof that substantially obviate one or more problems due to limitations and disadvantages of the related art. An object of the present disclosure is to provide a hybrid electric vehicle and a method of controlling the same to more effectively avoid a collision thereof.

In particular, the present disclosure provides a hybrid electric vehicle and a method of controlling the same to avoid a collision thereof in the situation in which an accelerator pedal is erroneously operated and to enable a driver to intuitively recognize the erroneous operation. However, the objects to be accomplished by the embodiments are not limited to the above-mentioned objects, and other objects not mentioned herein will be clearly understood by those skilled in the art to which the exemplary embodiments pertain from the following description.

To accomplish the above and other objects, a method of controlling a hybrid electric vehicle to avoid a collision thereof according to an exemplary embodiment of the present disclosure may include determining whether an accelerator pedal is erroneously operated in the situation in which an obstacle is detected to be present in the traveling path, in response to determining that that the accelerator pedal is erroneously operated, switching the driving mode to a mode in which an engine is disconnected from a driving shaft and a motor generates driving force, adjusting the number of revolutions per minute (RPM) of the engine based on the extent to which the accelerator pedal is operated, and adjusting the torque of the motor based on a first vehicle speed and the distance to the obstacle.

In addition, a hybrid electric vehicle according to an exemplary embodiment of the present disclosure may include a motor, an engine, and a collision avoidance control device. The collision avoidance control device may include a determination unit configured to determine whether an accelerator pedal is operated erroneously in the situation in which an obstacle is detected to be present in the traveling path, and a controller configured to, when the determination unit determines erroneous operation of the accelerator pedal, switch the driving mode to a mode in which the engine is disconnected from a driving shaft and the motor generates driving force, adjust the number of revolutions per minute (RPM) of the engine based on the extent to which the accelerator pedal is operated, and adjust the torque of the motor based on a first vehicle speed and the distance to the obstacle.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, embodiments of the present disclosure will be described in detail with reference to the accompanying drawings so that those skilled in the art may easily perform the exemplary embodiments. The present disclosure may, however, be embodied in many different forms, and should not be construed as being limited to the exemplary embodiments set forth herein. In the drawings, parts irrelevant to the description of the present disclosure will be omitted for clarity. Like reference numerals refer to like elements throughout the specification. The same reference numerals used throughout the specification refer to the same constituent elements.

Prior to describing a hybrid electric vehicle and a method of controlling the same to avoid a collision thereof according to an exemplary embodiment of the present disclosure, the structure and the control system of a hybrid electric vehicle to which exemplary embodiments of the present disclosure are applicable will first be described.

Figure 1:
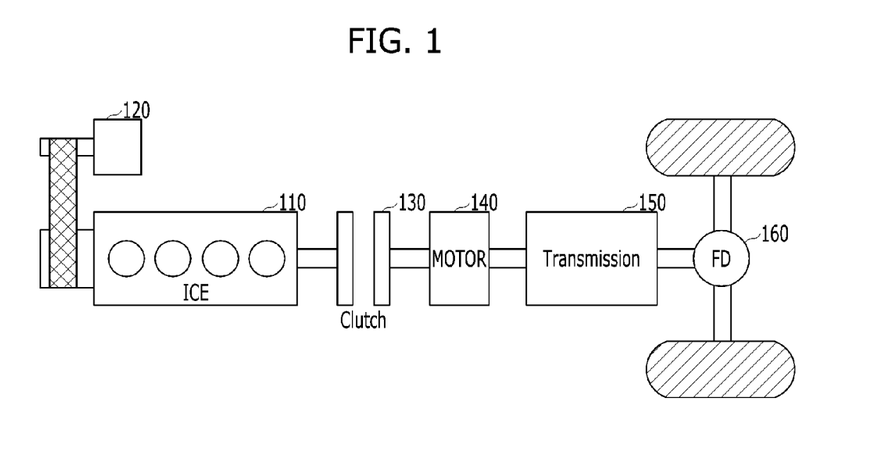
FIG. 1 shows an example of the structure of a powertrain of a parallel-type hybrid electric vehicle to which exemplary embodiments of the present disclosure are applicable.

FIG. 1 shows an example of the structure of a powertrain of a parallel-type hybrid electric vehicle to which exemplary embodiments of the present disclosure are applicable. FIG. 1 illustrates a powertrain of a hybrid electric vehicle employing a parallel-type hybrid system, in which a drive motor 140 and an engine clutch (EC) 130 are mounted between an internal combustion engine (ICE) 110 and a transmission 150.

In such a vehicle, when a driver engages an accelerator pedal after starting the vehicle, the motor 140 is first driven using the power of a battery in the state in which the engine clutch 130 is open, and then the power of the motor is transmitted to the wheels via the transmission 150 and a final drive (FD) 160 to rotate the wheels (i.e. the EV mode). When greater driving force is required as the vehicle is accelerated, a starter/generator motor 120 may be operated to drive the engine 110.

When the rotational speeds of the engine 110 and the motor 140 become equal, the engine clutch 130 is locked, with the result that both the engine 110 and the motor 140, or only the engine 110, drives the vehicle (i.e. transition from the EV mode to the HEV mode). When a predetermined engine OFF condition is satisfied, for example, when the vehicle is decelerated, the engine clutch 130 is open, and the engine 110 is stopped (i.e. transition from the HEV mode to the EV mode). In addition, when the hybrid electric vehicle is decelerated, the driving force of the wheels is converted into electrical energy, and the battery is charged with the electrical energy, which is referred to as recovery of braking energy or regenerative braking.

The starter/generator motor 120 may operate as a starter motor when the engine is started, and operate as a generator when the rotational energy of the engine is collected after the engine is started or when the engine is turned off. Therefore, the starter/generator motor 120 may alternatively be referred to as a "hybrid starter generator (HSG)", or may also be referred to as an "auxiliary motor" in some cases.

The driving mode of the hybrid electric vehicle will be described below in greater detail based on the above-described structure. The EV mode is mainly used in the situation in which the vehicle speed is low and the requested torque is low. In the EV mode, the engine clutch 130 is open, and only the motor 140 is used as a power source to transmit torque to the wheels.

The HEV mode is mainly used in the situation in which the vehicle speed is high and the requested torque is high. In the HEV mode, both the engine 110 and the motor 140 are used as power sources. The HEV mode may be divided into an HEV series mode and an HEV parallel mode. In the HEV series mode, the engine clutch 130 is open (i.e. the engine 110 and the driving shaft are disconnected from each other), the power of the engine 110 is used to generate power in the HSG 120, and only the motor 140 directly generates driving force. In contrast, in the HEV parallel mode, the engine clutch 130 is locked, and thus both the driving force of the engine 110 and the driving force of the motor 140 are transmitted to the wheels.

Figure 2:
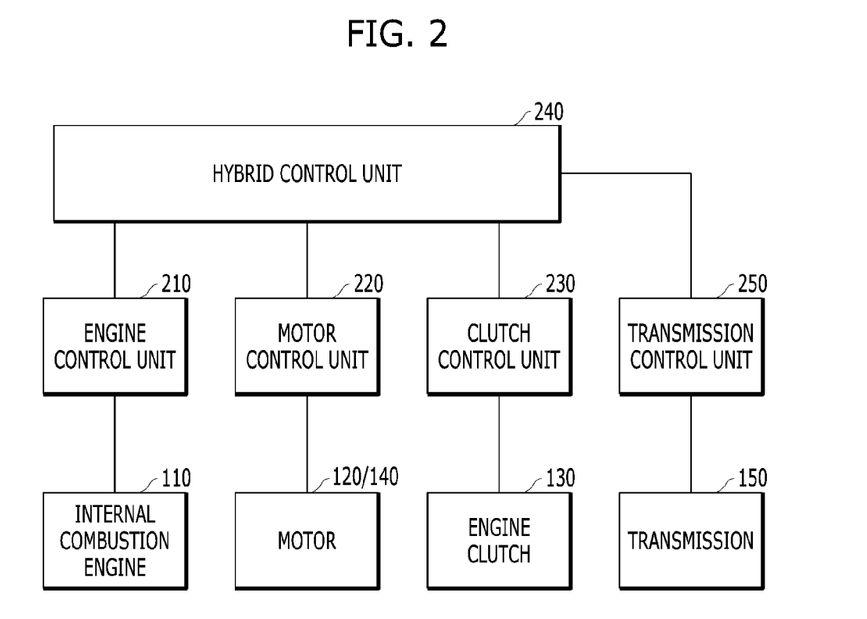
FIG. 2 is a block diagram showing an example of a control system of a hybrid electric vehicle to which exemplary embodiments of the present disclosure are applicable.

FIG. 2 is a block diagram showing an example of a control system of a hybrid electric vehicle to which exemplary embodiments of the present disclosure are applicable. Referring to FIG. 2, in a hybrid electric vehicle to which exemplary embodiments of the present disclosure are applicable, the internal combustion engine 110 may be operated by an engine control unit (controller) 210, and the torque of the starter/generator motor 120 and the drive motor 140 may be operated by a motor control unit (MCU) 220. The engine clutch 130 may be operated by a clutch control unit 230. In particular, the engine control unit 210 is referred to as an engine management system (EMS). In addition, the transmission 150 may be operated by a transmission control unit 250.

Each of the control units or controllers may be connected to a hybrid control unit (HCU) 240, which is an upper-level controller configured to execute the overall process of mode switching, and may provide information necessary for engine clutch control when switching a driving mode or shifting gears and/or information necessary for engine stop control to the hybrid control unit 240, or may perform an operation in response to a control signal under the operation of the hybrid control unit 240.

For example, the hybrid control unit 240 may be configured to determine whether to perform mode switching between the EV mode and the HEV mode depending on the traveling state of the vehicle. Accordingly, the hybrid control unit may be configured to determine the time at which to open the engine clutch 130. When the engine clutch 130 is open, the hybrid control unit may be configured to perform hydraulic pressure control (in the case of a wet engine clutch) or torque capacity control (in the case of a dry engine clutch). Further, the hybrid control unit 240 may be configured to determine the state of the engine clutch 130 (e.g., lock-up, slip, open, etc.), and may be configured to adjust the time at which to stop injecting fuel into the engine 110.

In addition, the hybrid control unit may be configured to transmit a torque command for adjusting the torque of the starter/generator motor 120 to the motor control unit 220 to control stopping of the engine, thereby controlling recovery of the rotational energy of the engine. In addition, the hybrid control unit 240 may be configured to determine the mode-switching condition and operate the lower-level controller to perform mode switching at the time of performing driving-mode-switching control.

Of course, it will be apparent to those skilled in the art that the connection relationships between the controllers and the functions/division of the controllers described above are merely illustrative and are not limited by the names thereof. For example, the hybrid control unit 240 may be implemented such that the function thereof is provided by any one of the controllers other than the hybrid control unit 240 or such that the function thereof is distributed and provided by two or more of the other controllers.

The above-described configuration in FIGS. 1 and 2 is merely an exemplary configuration of a hybrid electric vehicle. It will be apparent to those skilled in the art that the hybrid electric vehicle to which exemplary embodiments of the present disclosure are applicable is not limited to having the above-described configuration.

Hereinafter, collision avoidance control according to exemplary embodiments of the present disclosure will be described based on the above-described configuration of the hybrid electric vehicle.

An exemplary embodiment of the present disclosure proposes technology of limiting the torque of the motor of the hybrid electric vehicle based on the vehicle speed and the distance to an obstacle when the accelerator pedal is operated in the state in which a certain gear stage is locked so that the vehicle travels in one direction and in which the distance to an obstacle present in the traveling path of the vehicle is less than a predetermined distance. In particular, the powertrain may be operated to enter the HEV series mode, and the RPM of the engine may be adjusted based on the extent to which the accelerator pedal is operated to allow the driver to detect erroneous operation of the accelerator pedal by hearing the noise of the engine. The configuration of the control device for achieving this will be described below with reference to FIG. 3.

Figure 3:
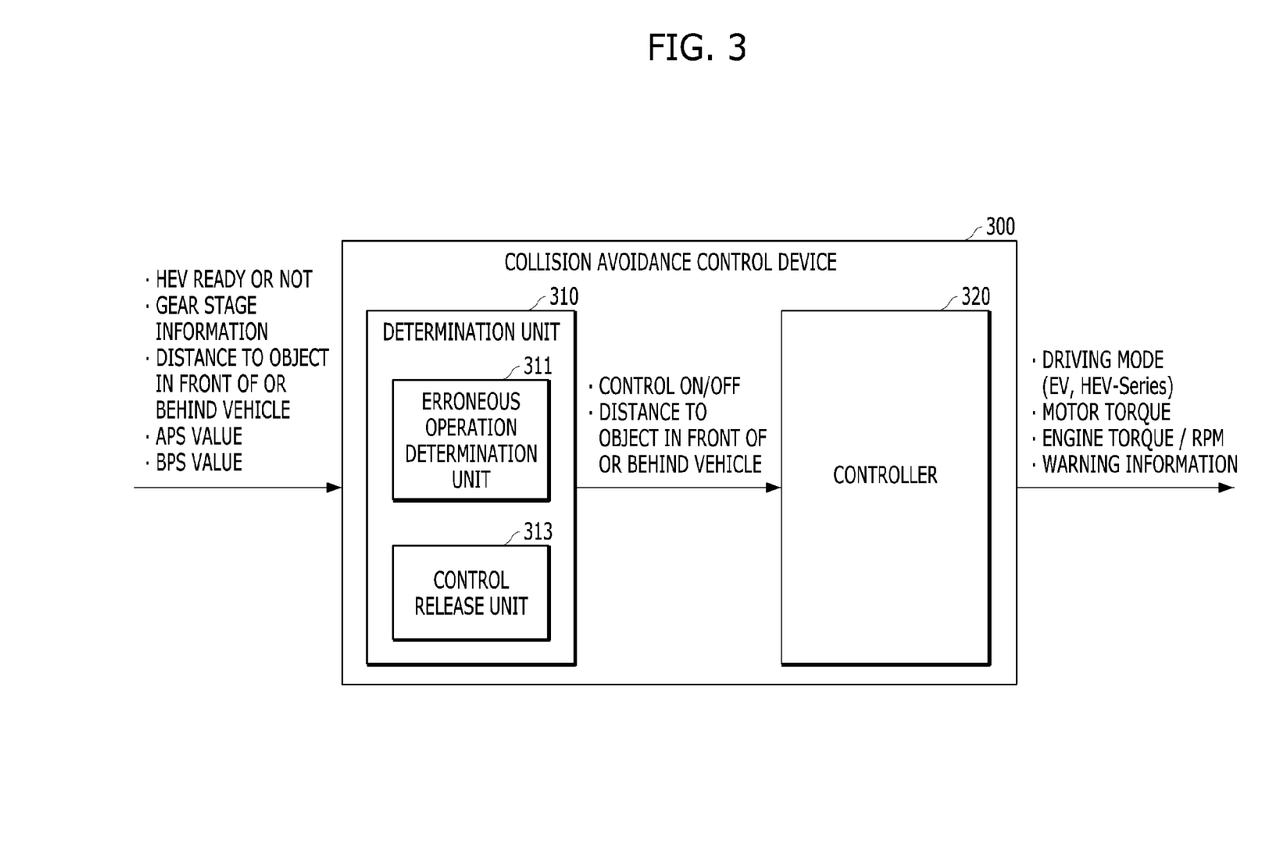
FIG. 3 shows an example of the configuration of a collision avoidance control device according to an exemplary embodiment of the present disclosure.

FIG. 3 shows an example of the configuration of a collision avoidance control device according to an exemplary embodiment of the present disclosure. Referring to FIG. 3, a collision avoidance control device 300 according to an exemplary embodiment may include a determination unit 310 and a controller 320.

The determination unit 310 may include an erroneous operation determination unit 311, configured to detect an erroneous operation situation of the accelerator pedal and determine whether to perform collision avoidance control, and a control release unit 313, configured to determine whether the erroneous operation situation of the accelerator pedal has been terminated and release the collision avoidance control.

The controller 320 may be configured to receive an instruction to perform or release collision avoidance control from the determination unit 310, and may also be configured to obtain information on the distance to an object present in the traveling path of the vehicle. In response to receiving an instruction to perform collision avoidance control from the determination unit 310, the controller 320 may be configured to set the driving mode to the HEV series mode, and adjust the operation states of the motor and the engine. In addition, the controller 320 may be configured to output warning information indicating the erroneous operation situation of the accelerator pedal through a predetermined output device (e.g. a display of a cluster or a speaker) in a control entry situation.

Hereinafter, the operation of the components of the collision avoidance control device 300 will be described in more detail. The determination unit 310 may be configured to receive information on whether the hybrid electric vehicle is ready for travel (i.e. HEV Ready, which corresponds to "IG on" of a general vehicle), information on the currently selected gear stage, information on the distance to an object present in the traveling path of the vehicle (i.e. in front of or behind the vehicle), information on the value of an accelerator pedal position sensor (APS), and information on the value of a brake pedal position sensor (BPS).

The information on the currently selected gear stage may be obtained from the transmission control unit 250, and the distance information may be obtained through a sensor configured to detect a distance, such as a vision sensor, a radar, or a lidar, or through a controller configured to operate the distance detection sensor, e.g. an advanced driver assistance system (ADAS) control unit. The APS value or the BPS value may be directly obtained from the corresponding sensor, or may be obtained through another controller configured to operate the powertrain, such as the engine control unit 210, without being limited thereto.

The erroneous operation determination unit 311 may be configured to determine to begin collision avoidance control according to an exemplary embodiment when the driver operates or engages the accelerator pedal in the situation in which the current state of the vehicle is "HEV Ready", in which a certain gear stage (i.e. the drive (D) range or the reverse (R) range) is locked so that the vehicle travels in one direction, and in which the distance to an object present in the traveling path of the vehicle is less than a predetermined distance $D_{thr}$.

In particular, $D_{thr}$ may be obtained by multiplying $v_{avg\_2}$ by $t_{collision\_2}$. $v_{avg\_2}$ represents the average of the speed profile that the vehicle is to travel during $t_{collision\_2}$ according to the extent to which the accelerator pedal is operated by the driver, and $t_{collision\_2}$ represents a fixed value (e.g. 3 seconds). However, the value of $t_{collision\_2}$ may be variably set based on the specifications of the vehicle and the traveling environment of the vehicle. The speed profile may be calculated using a formula according to the APS value based on the driving mode (e.g., the EV mode or the HEV mode) and the current vehicle speed, or may be provided in a plural number in advance according to at least one of the driving mode, the current vehicle speed, or the APS value, without being limited thereto.

In the situation in which collision avoidance control is activated by the determination of the erroneous operation determination unit 311, when the driver performs an operation indicating his/her willingness to release the collision avoidance control, for example, engages the brake pedal or shifts the gear stage to the neutral range (N range) or the parking range (P range), the control release unit 313 may be configured to instruct the controller 320 to release the control.

In response to receive receiving a control entry signal from the erroneous operation determination unit 311, the controller 320 may be configured to activate collision avoidance control. During collision avoidance control, the driving mode may be an HEV series mode. Accordingly, the engine clutch 130 may be operated to enter an open state, and the engine 110 may be operated in an idle state at the time of entering control. As the driver operates the accelerator pedal, the controller 320 may be configured to adjust the RPM of the engine 110 based on an APS value. For example, the RPM of the engine may be adjusted through a function of an APS value (fnc1(APS)). Accordingly, although the acceleration of the vehicle is limited by limiting the torque of the motor, which will be described later, the driver may intuitively recognize erroneous operation of the accelerator pedal through a sound generated by an increase in the RPM of the engine.

In addition, the controller 320 may be configured to limit the torque of the motor, which generates force for driving the vehicle, in multiple stages based on the vehicle speed profile and the distance to an object. For example, when the torque of the motor 140 is motorTq, the torque of the motor may be obtained as follows: motorTq=fnc2(vehicle speed profile, distance to object).

Further, assuming that the torque of the motor is limited in two stages, if the value obtained by multiplying $v_{avg\_1}$ by $t_{collision\_1}$ is equal to or less than the distance to an object present in the traveling path, this corresponds to the first stage, and the torque is limited to "motorTq" calculated using the above equation. If the value obtained by multiplying $v_{avg\_1}$ by $t_{collision\_1}$ is greater than the distance to an object present in the traveling path, this corresponds to the second stage, and the torque is limited to a value that is smaller than "motorTq" calculated using the above equation, for example, to zero. In particular, $v_{avg\_1}$ represents the average of the speed profile that the vehicle is to travel during $t_{collision\_1}$ according to the extent to which the accelerator pedal is operated by the driver, and $t_{collision\_1}$ represents a fixed value (e.g. 1 second). However, the value of $t_{collision\_1}$ may be variably set based on the specifications of the vehicle and the traveling environment of the vehicle. It is preferable that $t_{collision\_1}$ be set to be shorter than $t_{collision\_2}$.

Figure 4:
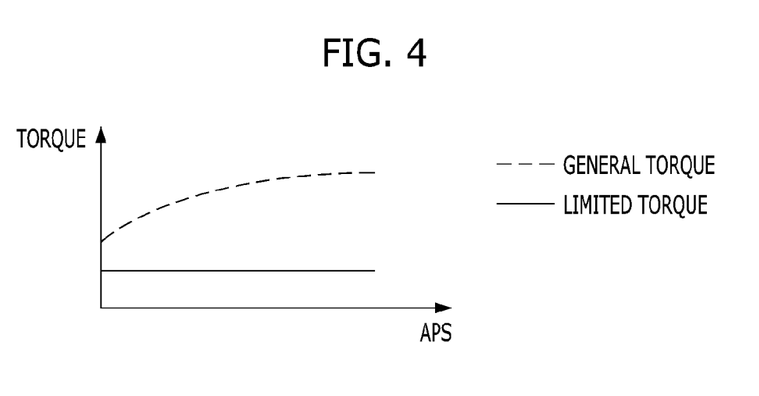
FIG. 4 shows an example of a process of limiting the torque of a motor according to an exemplary embodiment of the present disclosure.

FIG. 4 shows an example of a process of limiting the torque of the motor according to an exemplary embodiment of the present disclosure. Referring to FIG. 4, in a general situation, the torque of the motor tends to increase as the APS value increases. However, when torque limit control according to the exemplary embodiment is activated, the torque of the motor may be limited to a value of "fnc2 (vehicle speed profile, distance to object)", rather than the APS value.

Meanwhile, the collision avoidance control device 300 described above with reference to FIG. 3 may be implemented as a separate control unit, or may be implemented as a function of the hybrid control unit 240. However, this is merely illustrative, and the embodiments are not limited thereto.

Figure 5:
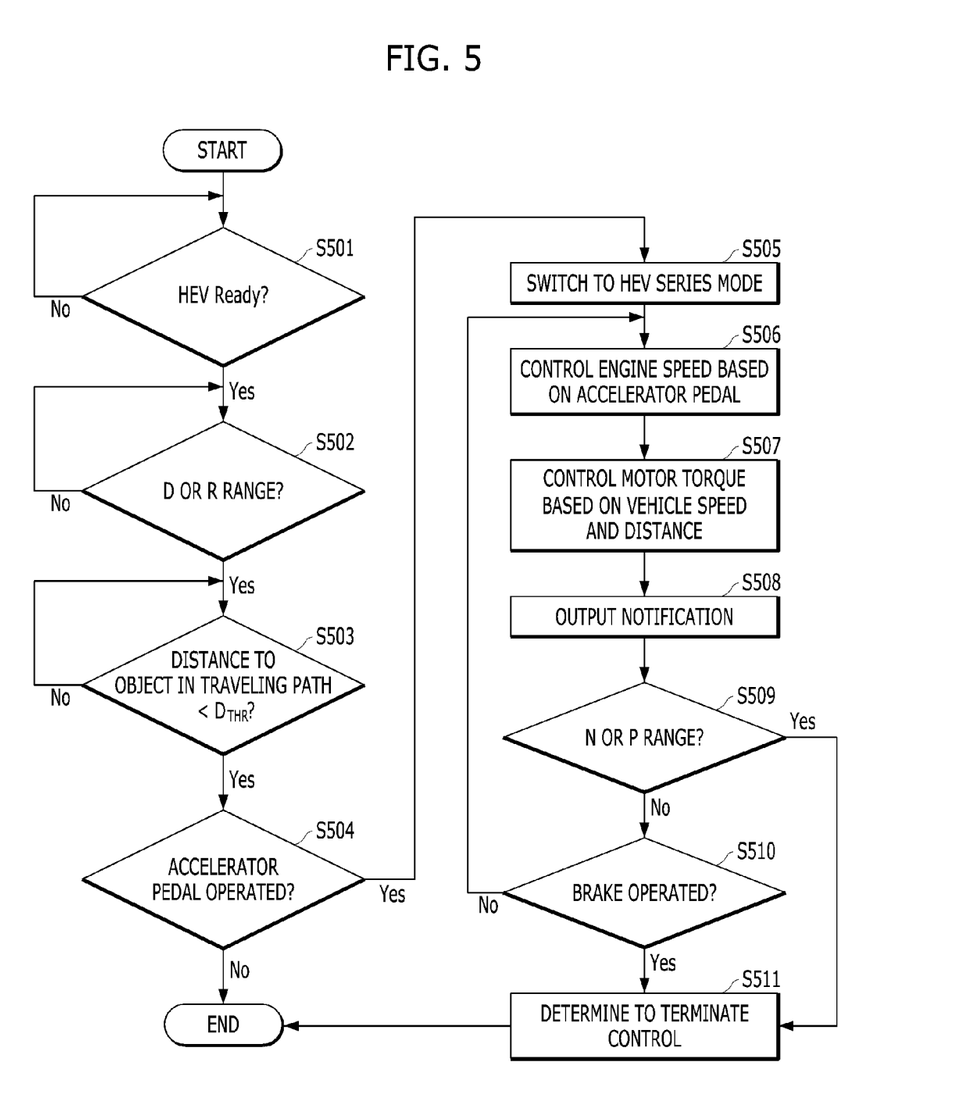
FIG. 5 is a flowchart showing an example of a collision avoidance control process according to an exemplary embodiment of the present disclosure.

FIG. 5 is a flowchart showing an example of a collision avoidance control process according to an exemplary embodiment of the present disclosure. Referring to FIG. 5, the erroneous operation determination unit 311 may be configured to determine to begin collision avoidance control according to the exemplary embodiment when the current state of the vehicle is "HEV Ready" (Yes in S501), a certain gear stage (i.e. the D range or the R range) is locked so that the vehicle travels in one direction (Yes in S502), the distance to an object present in the traveling path of the vehicle is less than a predetermined distance $D_{thr}$ (Yes in S503), and the driver operates the accelerator pedal (Yes in S504).

The controller 320 may be configured to activate collision avoidance control in response to the control entry instruction from the erroneous operation determination unit 311. In other words, the controller 320 may be configured to perform control such that the driving mode is switched to the HEV series mode (S505). For example, the hybrid control unit 240 may be configured to operate the engine clutch 130 to enter an open state in response to a control command of the controller 320.

In addition, the controller 320 may be configured to adjust the speed of the engine (the RPM of the engine) based on the APS value (i.e. fnc1(APS)) (S506), and may be configured to adjust the torque of the motor based on the vehicle speed profile and the distance to an object present in the traveling path (S507). As described above, the torque of the motor may be limited in multiple stages to the value of "fnc2 (vehicle speed profile, distance to object)" or 0 according to the value obtained by multiplying $v_{avg\_1}$ by $t_{collision\_1}$ and the distance to an object present in the traveling path. In addition, the controller 320 may be configured to operate an output unit to output notification information for notifying the driver of the erroneous operation situation (S508).

Figure 6:
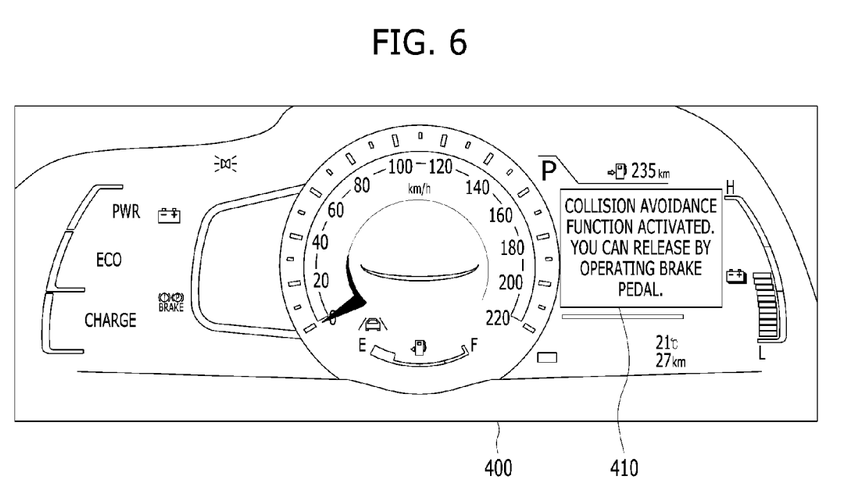
FIG. 6 shows an example of output of notification information according to an exemplary embodiment of the present disclosure.

FIG. 6 shows an example of output of notification information according to an exemplary embodiment of the present disclosure. Referring to FIG. 6, notification information may be output through a region 410 of a cluster 400, which is configured as a display capable of displaying graphics. However, this is merely illustrative, and notification information may be output in the form of a warning light, rather than graphics. Of course, notification information may be displayed through a head-up display (HUD) or a display of a head unit, rather than the cluster.

Referring back to FIG. 5, after collision avoidance control is activated, when the driver shifts the gear stage to the N range or the P range (Yes in S509) or operates the brake pedal (Yes in S510), the control release unit 313 may be configured to determine to terminate the control (S511) and may be configured to transmit a control release instruction to the controller 320.

Accordingly, the controller 320 may be configured to release the collision avoidance control. When the collision avoidance control is released, the hybrid control unit 240 may be configured to operate the powertrain according to a default setting. In particular, the default setting may be a setting, based on which powertrain is controlled according to the state of the battery, the APS value, the BPS value, etc. in a general travel situation, rather than a setting for adjusting the speed of the engine based on the accelerator pedal or adjusting the torque of the motor based on a vehicle speed and a distance in the above-described HEV series mode.

The present disclosure may be implemented as code that may be written on a non-transitory computer-readable recording medium and thus read by a computer system. The non-transitory computer-readable recording medium includes all types of recording devices in which data that may be read by a computer system are stored. Examples of the computer-readable recording medium include a Hard Disk Drive (HDD), a Solid-State Disk (SSD), a Silicon Disk Drive (SDD), a Read-Only Memory (ROM), a Random Access Memory (RAM), a Compact Disk ROM (CD-ROM), a magnetic tape, a floppy disc, and an optical data storage.

As is apparent from the above description, a hybrid electric vehicle according to at least one exemplary embodiment of the present disclosure configured as described above is capable of achieving more effective collision avoidance control. In particular, collision avoidance control may be performed based on a vehicle speed and the distance to an obstacle present in the traveling path in the situation in which the accelerator pedal is erroneously operated, and the speed of the engine may be adjusted based on the extent to which the accelerator pedal is operated in the state in which the engine is disconnected from the driving shaft, thereby enabling the driver to intuitively recognize erroneous operation of the accelerator pedal.

However, the effects achievable through the disclosure are not limited to the above-mentioned effects, and other effects not mentioned herein will be clearly understood by those skilled in the art from the above description.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

What is claimed is:

1. A method of controlling a hybrid electric vehicle to avoid a collision thereof, comprising:
   determining, by a controller, whether an accelerator pedal is erroneously operated in response to detecting an obstacle in a traveling path of the vehicle;
   in response to determining that the accelerator pedal is erroneously operated,
      switching, by the controller, a driving mode to a mode in which an engine is disconnected from a driving shaft and a motor generates driving force, wherein the switching includes opening an engine clutch disposed between the motor and the engine;
      adjusting, by the controller, a number of revolutions per minute (RPM) of the engine based on an extent to which the accelerator pedal is operated; and
      adjusting, by the controller, a torque of the motor based on a first vehicle speed and a distance to the obstacle.

2. The method according to claim 1, wherein the adjusting the torque of the motor includes setting the torque of the motor to a first limited torque when a first distance obtained by multiplying the first vehicle speed by a first time period is equal to or less than a distance to the obstacle, and wherein the first vehicle speed is an average speed of a first vehicle speed profile that is to be obtained during the first time period according to operation of the accelerator pedal.

3. The method according to claim 2, wherein the adjusting the torque of the motor further includes setting the torque of the motor to a second limited torque less than the first limited torque when the first distance obtained by multiplying the first vehicle speed by the first time period is greater than the distance to the obstacle.

4. The method according to claim 3, wherein the second limited torque is 0.

5. The method according to claim 1, wherein the determining whether the accelerator pedal is erroneously operated is performed to determine that the accelerator pedal is erroneously operated when the accelerator pedal is operated in a state in which the hybrid electric vehicle is ready for travel, in which a gear stage is shifted to a driving range or a reverse range, and in which a distance to the obstacle is less than a second distance.

6. The method according to claim 5, wherein the second distance is obtained by multiplying a second vehicle speed by a second time period, and wherein the second vehicle speed is an average speed of a second vehicle speed profile that is to be obtained during the second time period according to operation of the accelerator pedal.

7. The method according to claim 1, further comprising:
   when a gear stage is shifted to a neutral range or a parking range or when a brake pedal is operated, operating the motor and the engine according to a default setting.

8. The method according to claim 1, further comprising:
   in response to determining that the accelerator pedal is erroneously operated, outputting, by the controller, information indicating erroneous operation through a predetermined output unit.

9. A non-transitory computer-readable recoding medium containing a program configured to perform a method of controlling a hybrid electric vehicle to avoid a collision thereof according to claim 1.

10. A hybrid electric vehicle, comprising:
a motor;
an engine; and
a collision avoidance control device, wherein the collision avoidance control device includes:
- a determination unit configured to determine whether an accelerator pedal is erroneously operated in a situation in which an obstacle is detected to be present in a traveling path; and
- a controller configured to, when the determination unit determines erroneous operation of the accelerator pedal;
  - switch a driving mode to a mode in which the engine is disconnected from a driving shaft and the motor generates driving force,
  - adjust a number of revolutions per minute (RPM) of the engine based on an extent to which the accelerator pedal is operated,
  - adjust a torque of the motor based on a first vehicle speed and a distance to the obstacle, and
  - open an engine clutch disposed between the motor and the engine.

11. The hybrid electric vehicle according to claim 10, wherein the controller is configured to set the torque of the motor to a first limited torque when a first distance obtained by multiplying the first vehicle speed by a first time period is equal to or less than a distance to the obstacle, and wherein the first vehicle speed is an average speed of a first vehicle speed profile that is to be obtained during the first time period according to operation of the accelerator pedal.

12. The hybrid electric vehicle according to claim 11, wherein the controller is configured to set the torque of the motor to a second limited torque less than the first limited torque when the first distance obtained by multiplying the first vehicle speed by the first time period is greater than the distance to the obstacle.

13. The hybrid electric vehicle according to claim 12, wherein the second limited torque is 0.

14. The hybrid electric vehicle according to claim 10, wherein the determination unit is configured to determine that the accelerator pedal is erroneously operated when the accelerator pedal is operated in a situation in which the hybrid electric vehicle is ready for travel, in which a gear stage is shifted to a driving range or a reverse range, and in which a distance to the obstacle is less than a second distance.

15. The hybrid electric vehicle according to claim 14, wherein the second distance is obtained by multiplying a second vehicle speed by a second time period, and wherein the second vehicle speed is an average speed of a second vehicle speed profile that is to be obtained during the second time period according to operation of the accelerator pedal.

16. The hybrid electric vehicle according to claim 10, wherein, when a gear stage is shifted to a neutral range or a parking range or when a brake pedal is operated, the determination unit is configured to operate the motor and the engine according to a default setting.

17. The hybrid electric vehicle according to claim 10, further comprising:
an output unit configured to output information indicating erroneous operation when the determination unit determines erroneous operation of the accelerator pedal.

\* \* \* \* \*